No. 691,017. Patented Jan. 14, 1902.
E. THOMSON.
GAS OR OIL INTERNAL COMBUSTION ENGINE.
(Application filed Jan. 17, 1898.)
(No Model.) 3 Sheets—Sheet 3.

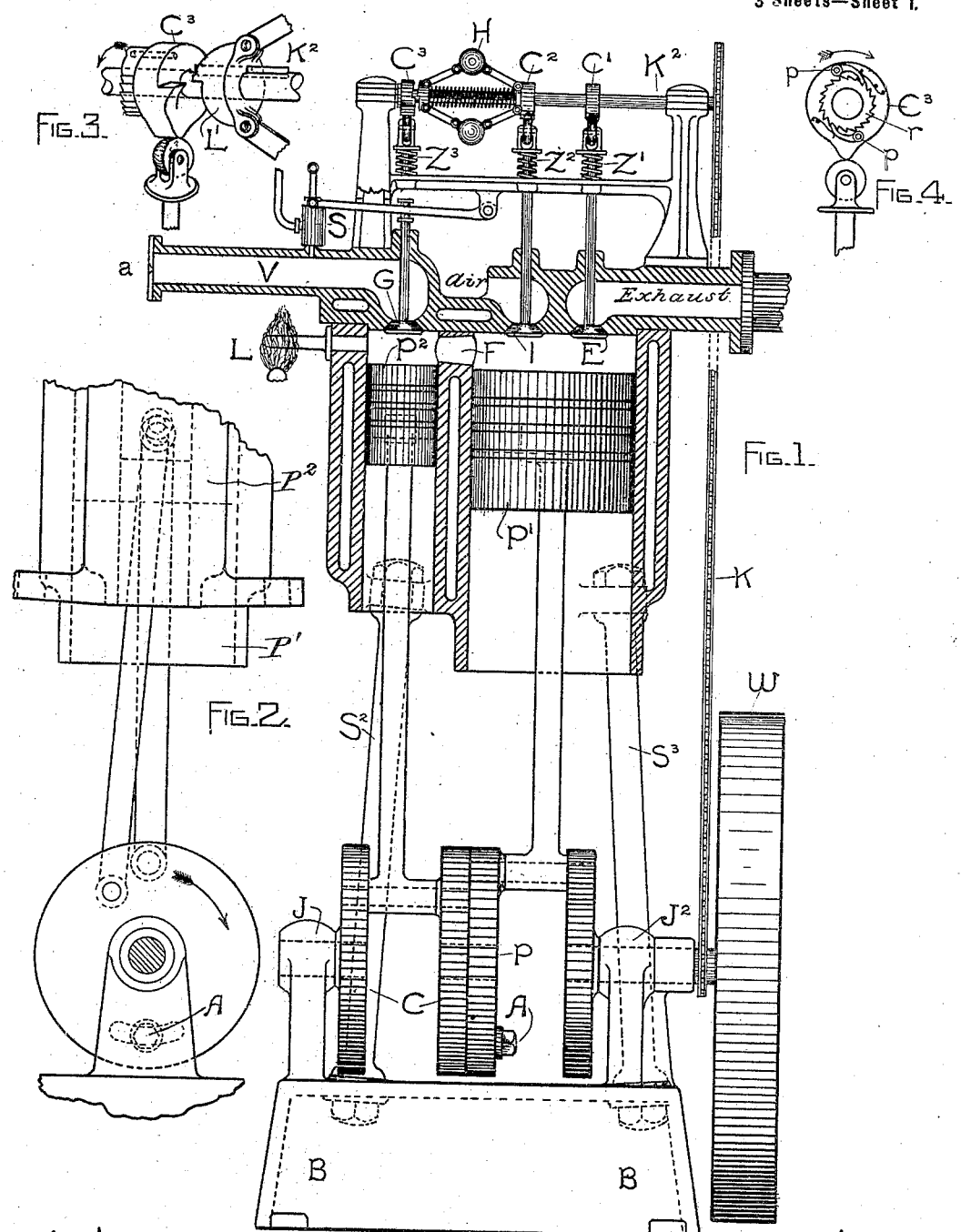

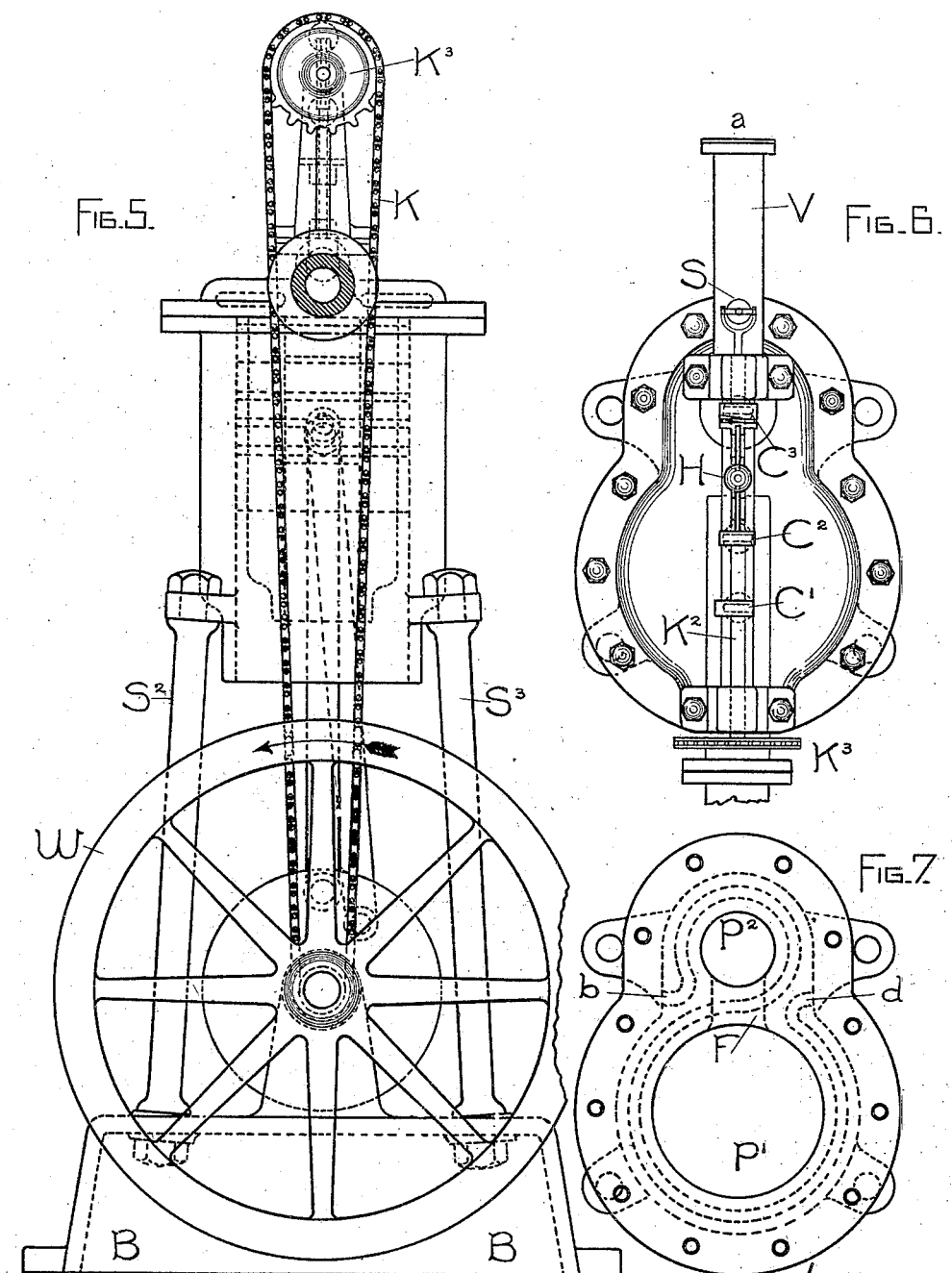

WITNESSES.
Henry O. Westendarp
Dugald McKillop

INVENTOR
Elihu Thomson

UNITED STATES PATENT OFFICE.

ELIHU THOMSON, OF SWAMPSCOTT, MASSACHUSETTS.

GAS OR OIL INTERNAL-COMBUSTION ENGINE.

SPECIFICATION forming part of Letters Patent No. 691,017, dated January 14, 1902.

Application filed January 17, 1898. Serial No. 666,901. (No model.)

*To all whom it may concern:*

Be it known that I, ELIHU THOMSON, a citizen of the United States, residing in the town of Swampscott, county of Essex, State of Massachusetts, have invented certain new and useful Improvements in Gas or Oil Internal-Combustion Engines, of which the following is a specification.

The objects of the invention are to secure greater manageability and economy of working, to prevent as far as possible bad effects of preignition in large engines, and to secure when desired in a simple structure effects of large expansion from a small fuel charge and also to secure a complete combustion of such charge in excess of air.

In my invention I take in in one cylinder a charge of air, while at the same time drawing in or filling in another cylinder in free communication with the first with a combustible mixture of either inflammable gas or air in proper proportions for explosion when ignited or a mixture of oil or gasolene vapor with air for the same purpose. The two charges in adjoining and connected cylinders then undergo compression by the return stroke, and at the conclusion of such compression the fuel or combustible charge is fired either by its own internal heat or the heat of the surrounding parts of the cylinder in which it is placed or by a suitable electrical or other ignition device, such as a hot tube. The charge thus fired at or near the completion of the compression-stroke begins its burning in the cylinder in which it has been compressed, and the great expansion during its burning forces it over in large part through the compressed air in the other cylinder, with which it mixes and thoroughly burns. This produces a rise of pressure in both cylinders almost simultaneously, after which the power-stroke is made by the gases expanding and forcing the pistons forward to the end of their play. When this has occurred, the exhaust-valve is opened and the gases escape from both cylinders on the fourth stroke or the second return stroke.

Other features of my invention will be pointed out in connection with the accompanying drawings.

Figure 10:
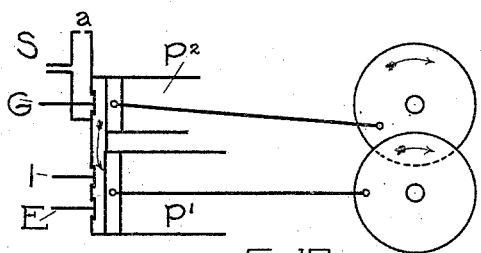
Figure 11:
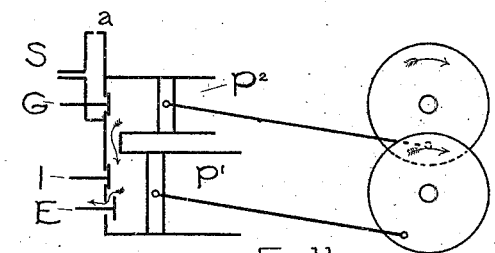
Figure 12:
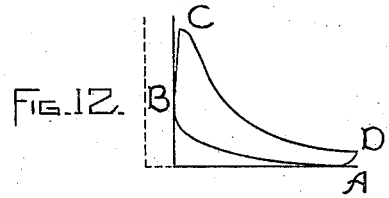
Figure 13:
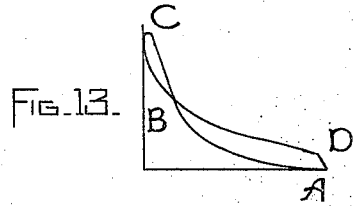
Figure 14:
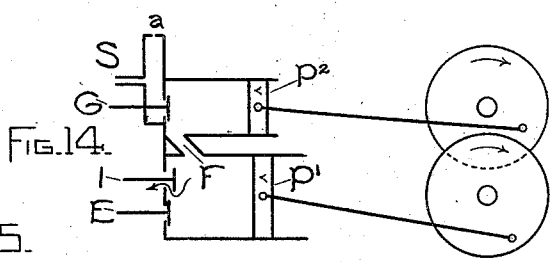
Figure 15:
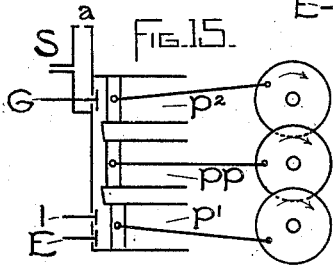
Figure 16:
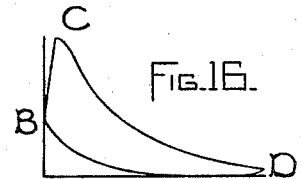
Figure 17:
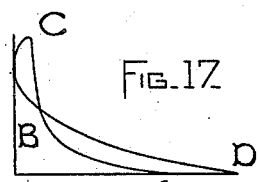
Figure 18:
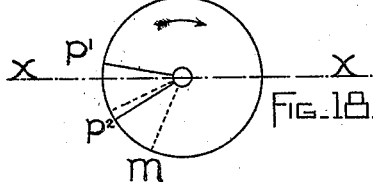

Referring to the drawings, Figure 1 is an elevation in part section of an engine embodying my invention. Fig. 2 is a partial end elevation corresponding to Fig. 1. Figs. 3 and 4 are details of one of the three ways by which the valves may be operated, though this is of no special consequence, provided they are given their proper sequence of opening and closing. Fig. 5 is an end elevation of the engine shown in Fig. 1. Fig. 6 is a plan view of the valve-moving parts of Fig. 1. Fig. 7 is a diagram indicating the relation of the two cylinders. Figs. 8, 9, 10, and 11 show diagrammatically the cycles of operation. Figs. 12 and 13 are approximate diagrams resembling indicated diagrams. Figs. 14 and 15 show variations in the cycle. Figs. 16 and 17 are diagrams of the variation. Fig. 18 shows the relations of cranks of the two cylinders under certain conditions.

In Fig. 1, B B represent the bed-plate of the structure, upon which the journals J $J^2$ are carried for the support of the revolving shaft, upon which the fly-wheel or power-pulley W is mounted, as shown. A set of cranks are constructed and mounted so as to have their angular relation or sequence of operation changed as desired, so that they may be put into coincidence or "kept in phase," so to speak, or thrown out of phase in a certain sequence to be explained. This feature, however, can be omitted and the cranks given a definite relation by original construction, so that they are either coincident or somewhat displaced in relation to each other. The change of relation indicated in the figure may be accomplished in any desired way, as that is not an essential feature of my invention. As illustrative of the change of relation the disk A may have a slot of some angular extent through which a strong bolt is passed to the adjoining disk C, and when they are drawn firmly together around a central pin P they remain in the relation so given during the action of the engine. A large piston P' is connected to its appropriate crank-pin by a suitable connecting-rod, as shown, and the smaller piston $P^2$ also connected to its own crank-pin so as to move freely. The cylinders may be provided with water-jackets, the design or construction of which is not an important feature to be described here.

I is an inlet-valve for air.

E is the exhaust-valve for gases to be abstracted, while the valve G may be called the "fuel-admission" valve, it being preferred to mix with the fuel admitted with the valve G a certain proportion of air, although this is not essential where a fixed gas, like coal-gas, is used; but where oil of a fairly high boiling-point is admitted it is preferable to secure an admixture of air, which tends to keep it from condensing. In the use of oil a chamber V, heated by a lamp L, may be employed for vaporizing the oil injected therein by a supply-pump S, and an opening $a$ for admission of air may be made in V, so as to mix the incoming charge as desired. With gas as a fuel the supply-pump S can be supplanted by a gas-pump or a simple connection to the gas-supply under a small head.

A suitable gearing, such as an endless chain K, drives from the main shaft a cam-shaft $K^2$, the relation of rotations being two of the main shaft to one of the cam-shaft $K^2$, as usual in gas-engine construction. Any other suitable gearing may be used to operate the valves in a particular sequence; but, as shown, the shaft $K^2$ is mounted on suitable bearings and has upon it a set of cams $C'$ $C^2$ $C^3$. It may also carry the governor H for disengaging the fuel-admission cam $C^3$ or so operate upon the valves as to render the engine incapable of performing its regular cycle. The governor H could, of course, be mounted upon the main shaft with any suitable form of disengaging apparatus for the valves; but so far as these parts are used in the figures they may be taken as illustrating the actions taking place in the operation of the engine and not as essential constructions for performing these operations.

The valve-stems of the valves G, I, and E are suitably guided, as shown. Springs $Z'$ $Z^2$ $Z^3$ are provided, and by these springs the valves are closed, while roller-bars may be provided for the cams to run on and actuate the valve during the operation.

In Fig. 3 is shown a form of disengaging mechanism for preventing the opening of the valve G by disengaging its operating-cam $C^3$ from the shaft and allowing it to fail to rotate with cam-shaft $K^2$ when the speed is such that the part $L'$ under control of the governor H is drawn along on the shaft away from the cam $C^3$. The cam is so mounted as to be free of the shaft except when propelled by the part $L'$, having a projection engaging with a corresponding projection on the cam $C^3$, as shown. Cam $C^3$ has, however, no lateral play or end play along the shaft, being mounted between suitable collars or otherwise sustained in proper relation. It is preferable also to arrange that the cam $C^3$ shall be free to be turned around the shaft $K^2$ or the shaft $K^2$ to turn within the cam $C^3$ in one direction only. To accomplish this result, the cam $C^3$ may carry with it a pair of pawls $p$ $p$, Fig. 4, engaging with the ratchet-wheel $r$, carried by the shaft $K^2$. This will permit engagement of the cam and its disengagement by the part $L'$ and at the same time will prevent the valve-stem and spring $Z^3$ from throwing the cam forward in the direction of the arrow, which would otherwise occur when the cam had passed the middle point of opening of valve G and the valve was about to close on the receding side of the cam.

The sequence of connections of the cams $C'$ $C^2$ $C^3$ is as follows, and the operation of the engine may be explained in connection with this sequence: Assuming that the pistons of the engine are in the position shown in the figures—i. e., that the larger piston $P'$ is on dead-center and the smaller piston $P^2$ is following the same to a certain angle of the crank-pins—then very soon after the rotation in Fig. 2 has carried the crank of $P'$ over center the crank-pin of $P^2$ will have driven said piston nearly to the bottom of the cylinder in which it moves. The clearance-space for both pistons will then be a small space back of piston $P^2$ and a larger volume of clearance back of piston $P'$. The continued rotation will now draw piston $P'$ downward and forward, and cam $C^2$ will be set so as to allow a charge of air to be drawn in. As soon, however, as piston $P^2$ begins to leave the bottom of its cylinder valve G is opened by cam $C^3$, and the same movement may be made to inject a determinate quantity of vaporizable oil by pump S into the vaporizer V or a given volume of gas may be admitted through valve G. A moderate-sized opening at $a$ allows a little air to enter V, which mixes with the indrawn charge. While, therefore, the space back of piston $P'$ is being filled with air through the inlet-valve I the space back of $P^2$ is being filled through G with combustible gas or vapor mixed with air which comes along therewith and with a portion of the air entering through valve I when open. This indrawing action continues until the large piston $P'$ has passed outward and is slightly over its dead-center, or the admission may, if desired, be cut off at some intermediate point. When both cylinders are filled with their appropriate gases, piston $P'$ begins to return and is followed by piston $P^2$, according to the chosen angle of displacement of their cranks, and the compression-stroke in both cylinders begins. The piston $P'$ having slightly the lead of piston $P^2$, the tendency is to keep the combustible mixture in the space back of $P^2$, owing to a slight flow of air from the larger cylinder into the smaller. This air not being mixed with combustible gases itself, except it is driven into the smaller cylinder, tends to prevent too early ignition of the charge in the smaller cylinder. When the large piston $P^2$ has reached the end of its upward or compression stroke, the gases in both cylinders will have reached a pressure depending upon the space allowed them and their temperature. This may be set so as to be fifty, seventy-five, or one hundred pounds per square inch or other pressure found desirable. As the piston $P'$ is on a dead-center, the piston $P^2$ in falling goes on compressing the charge, and it is during this period or relation that the firing of the charge takes place by the combustible mixture being driven when compressed into an ignition-tube L, especially on the starting of the machine. The firing of the charge, however, occurs only in the space immediately adjacent to piston $P^2$, and the burning thereof, attended by an increased pressure and volume, causes the flame from the smaller cylinder to be shot briskly into the space back of the large piston $P'$ filled with compressed air. If the expulsion is made with an excess of combustible in the charge found in $P^2$, the excess of air in $P'$ completes the combustion. This burning greatly raises the pressure back of both pistons, and as the cranks continue turning the work of expansion is taken upon piston $P'$ at the first, while on account of displacement piston $P^2$ still continues toward the bottom of its cylinder, tending thus to expel nearly the whole of its charge therefrom into the larger cylinder. A small amount of negative work is accomplished during this transference, but only when the piston $P^2$ follows the piston $P'$ through a certain angle of cranks. When piston $P^2$ passes over the dead-center, both pistons then act together for power or delivery of return force by the cranks to the main shaft of the wheel W. This may be called the "power-stroke" of the engine, and the cylinder in which piston $P'$ plays may be called the "power-cylinder," while the cylinder in which piston $P^2$ plays, inasmuch as it serves as a mixing and compressing space for the combustible charge, may be termed the "fire-cylinder." On the completion of the downward or power stroke by the pistons they again return or move upward, during which stroke the exhaust-valve E is open and the waste gases are expelled, leaving only such an amount thereof as fills the clearance-space back of the large piston $P'$ and partly that back of piston $P^2$ at the time of the completion of the exhaust-stroke, after which the operation proceeds as before, so that the engine works in a general way according to the Otto cycle, but in a different way in regard to the charges of compressed gas and their distribution.

It is desirable that after the engine is under way the cylinder in which piston $P^2$ plays shall not be kept too cold, as, in fact, the ignition may finally be allowed to depend upon the heat increase in the charge produced in it by compression and by the communication of heat thereto in the vaporizer V or from the cylinder-walls to the cylinder for piston $P^2$. In such case the ignition tube and lamp L would only be required to work at starting, the subsequent firing being due to a species of preignition, such as would be harmful in most types of engines, but which in my invention may be relied upon to actually produce firing of the charge. It will be understood that a water-jacket or artificial cooler of the cylinder-walls may be provided wherever the temperature of parts is liable to rise unduly, and in Fig. 1 spaces are indicated around valve G and around both cylinders which may be employed as water-jackets by the flow of a regulated supply of water therethrough.

In Fig. 5 the end elevation simply shows the relation of parts already described so far as they appear in such a view. $K^3$ is the sprocket-wheel, around which the chain K plays, $K^3$ being mounted on a cam-shaft $K^2$, Fig. 1. $S^2$ $S^3$ are the standards supporting the cylinders and their mechanism.

In Fig. 6 is shown a plan of the parts of Fig. 1, similar parts bearing the same letters.

In Fig. 7 there is shown in dotted lines the relation of the two cylinder-spaces which are connected by a passage F. It also shows how the circulation of water may be effected as including the cylinders from $b$ to $d$ or from $d$ to $b$, connecting-passages being made surrounding both cylinders.

Figure 8:
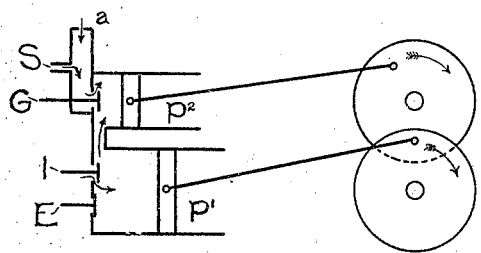

In Fig. 8 the condition of the valves during the intake stroke is shown, piston $P^2$ lagging behind piston $P'$, as stated, although they may, if desired, move in unison, the lagging arrangement of $P^2$ being the preferred one. The displacement of the cranks to produce this difference may be only slight, or it may be as much as forty-five degrees or even more. The displacement shown in the figures is about thirty degrees. In Fig. 8 the inlet-valve I is shown open during the intake stroke, as also the fuel-supply valve G. Air is then taken into the large cylinder and air or combustible vapor or gas mingled in the small cylinder. This continues during the outward or intake stroke.

Figure 9:
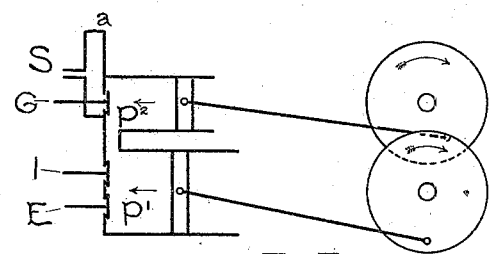

In Fig. 9 the valves are shown shut and compression is taking place by the return of the pistons $P^2$ $P'$. On the completion of this stroke firing takes place, and the condition arrived at at this time is indicated in Fig. 10, the valves being closed, and the fire passes from the space back of piston $P^2$ to that back of piston $P'$, the gases, both combustible and air, in respective cylinders having been brought to a considerable degree of compression. The pressure and expansion on the passage of the connecting-rods over the dead-center give the power-stroke, on the completion of which the exhaust-stroke begins, and this is shown in Fig. 11, where $P'$ and $P^2$ move back with the valve E alone open, causing the exhaust of both cylinders. This is followed by the taking in of a new charge, as in Fig. 8, unless the speed of the machine is so rising that the governor prevents the opening of the valves. It will be seen that by having the piston $P^2$ come near to the bottom the charge which is drawn into the cylinder of $P^2$ will have very little admixture of burned or exhaust gases, as they will have been expelled and driven forth into the space back of $P'$ and mixed with the incoming air, which is drawn into the cylinder of piston $P'$.

Fig. 12 would represent an indicator-diagram approximately such as might be obtained from the larger cylinder, the ordinates representing pressures and the abscissa or horizontals portions of the stroke, as usual in such diagrams. Here starting at A the piston starting in the charge begins to be compressed, and a certain pressure is reached at B before firing. On the firing of the charge the pressure rises to C quickly and then expands until the exhaust opens at D on the curve. The diagram then is similar to that obtained with an ordinary Otto cycle gas-engine. In the smaller cylinder the effect is more nearly that of Fig. 13, where on the lower or ascending curve compression continues from A until a certain time before the completion of the stroke, (assuming the cranks are displaced, say, thirty degrees,) when firing takes place at a pressure indicated by B on the ascending curve, which is the same pressure as in Fig. 12 at B. The rise of pressure continues during the further completion of the compression-stroke up to C, after which the curve returns on approximately an adiabatic curve to B, the tendency being to form a loop between B and C which would represent negative power or absorbed power during the finish of the stroke, while the area between the curves from B to D would represent actual power. Fig. 14 simply indicates that during a portion of the compression-stroke (as, e. g., during a third of it) the cylinder of piston P' may be discharging its contents through the inlet-valve, which valve is kept open for a determinate portion of the return stroke. Since piston $P^2$ lags behind P' in this return, very little of the gas in $P^2$ will be driven outward, and by arranging the passage F on a slant, as shown, toward the center of the large cylinder scarcely any of the combustible charge need escape, even though piston P' be allowed to pass back with the valve I open during one-half its return stroke or compression-stroke, for during this movement piston $P^2$ will be reaching the dead-center and passing it, making but little difference in the volume of gas back of it. The effect of this is to diminish the amount of compression of the compression-stroke, since the compression begins with the closing of the valve I. In this case, e. g., compression might begin in the large cylinder as in the diagram at A, Fig. 16, and be completed at B, and explosion or burning of the charge would then raise the pressure to C, and the fall of pressure during expansion of the power-stroke would carry the curve to D, which would leave a final pressure lower than would be the case with Fig. 12 or Fig. 13. Fig. 17 would indicate a similar curve for the smaller cylinder when used in this, which may be called the "partial charge" cycle, for, in fact, the amount of charge taken in may be so adjusted that on the opening of the exhaust the gases have almost reached atmospheric pressure. This would be done by timing the closure of the valve I, Fig. 14, in accordance with the desired amount of gas which it is proposed to compress. At the same time since cylinder P' takes in a full charge of air and may discharge a considerable fraction thereof the tendency is to cool the cylinder and to scavenge it to a certain extent, owing to the ejection of a portion of the cool charge admitted.

Fig. 15 indicates that in place of two cylinders, three cylinders may be connected together, and their cranks set apart may produce similar results—i. e., between the pistons $P^2$ and P' there may be mounted a third P P with intermediate action. The charge burned in P' heats the air both back of piston P P and P', and the power-stroke is made by the three pistons, one after the other.

In Fig. 18 is shown a diagram representing displacement of the cranks with respect to each other through thirty degrees, the position of the crank for the larger piston being indicated by the full line P' to the center, while that of the piston $P^2$ is indicated by the full line $P^2$ to the center. In this position, if the arrow represent the rotation P', the crank will have passed over the center when it is just beginning the forward stroke. $P^2$ has not reached the center, but is moving toward it. The dead-centers are assumed as upon the lines X X, or the pistons are assumed to be moved horizontally. Quite a considerable variation may occur in the positions of these cranks, while the system as a whole remains nearly on the dead-point. Thus the dotted lines show a displacement backward, which carries the large piston or its crank back of the dead-point and carries the smaller crank and piston still farther back. Should the gases, however, be fired in the smaller cylinder of the engine anywhere between the shown limits, the effectiveness of the engine in producing power is scarcely different for the different positions. Hence the ordinary action of preignition, which, if it occur in the smaller cylinder in the position represented by the dotted line to center mark, would be, in a single-cylinder engine, disastrous to the power; but since the larger piston is nearly at the point of passing a dead-center when this would occur in the double engine of my invention, as it will have actually passed the center, when it has still further moved through a small angle, too early firing has but little effect, and is immediately followed by the passage over dead-center of the large piston, which is peculiarly effective in the generation of power.

It will be evident that in the diagrams which have been given showing the distribution of pressures in Figs. 12, 13, 16, and 17 a considerable variation from the form there shown may exist in practice, while preserving the main features of my invention.

The engine of my invention may in part be regarded as an engine of the hot-air type with internal combustion, since the fuel charge itself when burned does not constitute the total expansible charge existing in the engine; but the burning of said charge with air serves to communicate heat to the large volume of air under pressure, thus diminishing the loss of heat to the walls of the cylinder, preventing such sudden shocks of explosion as occur in ordinary engines, and securing to a large extent immunity from bad effects of preignition of a charge in case they occur. At the same time there is insured the presence in the combined cylinders of a sufficient quantity of air to thoroughly complete the combustion of the fuel charge, and in consequence of this fact it is possible to operate with a charge in the small cylinder which is richer in fuel gas or vapor, and which, therefore, in burning burns more slowly, at the same time that the excess of air in the large cylinder insures the complete oxidization of the whole of such rich charge after explosion. On account of the dilution of the charge by the air in the large cylinder there is less liability to sudden transfers of heat to the walls, and the amount of water-jacketing therefore required and the loss of heat in the water-jacket will be usually less than in the types of engine not possessing the features of my invention.

What I claim as new, and desire to secure by Letters Patent of the United States, is—

1. In an internal-combustion engine, the combination of a power cylinder and piston, a fire-cylinder and piston, both pistons having the same cycle of operation, a crank-shaft to which both of the pistons are connected, the piston of the fire-cylinder being arranged to lag behind that of the power-cylinder, so that on the compression the power-piston tends to force air into the fire-cylinder, while after the firing takes place and the power-piston starts outward the piston in the fire-cylinder continues to move inward and force the charge into the power-cylinder, different-sized clearance-spaces for the cylinders, the smaller one being for the fire-cylinder, and a port which connects the two cylinders and is open at all times.

2. In an internal-combustion engine, the combination of power and fire cylinders and their pistons, the piston of the fire-cylinder being arranged to lag behind that of the power-cylinder whereby the first-mentioned piston will continue to move inward and force out the fuel charge after the power-piston has started on its outer stroke, a crank-disk for each piston, means for adjustably securing the disks, a port which connects these cylinders and is always open, an admission-valve, an exhaust-valve, and means for actuating the valves.

3. In an internal-combustion engine, the combination of fire and power cylinders which are always in free communication, pistons for each cylinder, that of the fire-cylinder being practically without clearance, while that of the power-cylinder is provided with a substantial amount of clearance, a crank-shaft to which the pistons are connected, a valve for introducing fuel into the limited space back of the fire-cylinder piston, a valve for admitting air to the larger space back of the power-piston, an ignition device, and an exhaust-valve which opens into the power-cylinder.

4. In an internal-combustion engine, the combination of fire and power cylinders which are always in open communication, pistons therefor, a crank-shaft to which the pistons are connected, an auxiliary shaft geared to the crank-shaft, a valve for admitting fuel to the fire-cylinder, cams actuated by the auxiliary shaft for actuating the valves, and a governor which is driven by the auxiliary shaft and is arranged to move into and out of operative engagement with the cam that operates the fuel-admitting valve.

5. In an internal-combustion engine, the combination of a piston, a cylinder therefor, a crank-shaft, an auxiliary shaft, a fuel-admitting valve, a cam for actuating the valve which is loosely mounted on the auxiliary shaft, a ratchet for preventing the cam from rotating backward, an automatic governor driven by the auxiliary shaft, and means actuated by the governor for engaging with and driving the cam forward.

6. In an internal-combustion engine, the combination of a power-cylinder and a fire-cylinder which are in permanent communication through an open port, a piston for the fire-cylinder which has a slight clearance, a piston for the power-cylinder which has a much greater clearance, a crank-shaft, and means for connecting the pistons to the crank-shaft in such a manner that the piston of fire-cylinder will lag behind that of the power-cylinder whereby all of the combustible will be discharged from the fire-cylinder.

In witness whereof I have hereunder set my hand this 13th day of January, 1898.

ELIHU THOMSON.

Witnesses:
DUGALD M. MCKILLOP,
JOHN MCMANUS.